US005925178A

United States Patent [19]

Martin et al.

[11] Patent Number: 5,925,178

[45] Date of Patent: Jul. 20, 1999

[54] PIGMENTED INKJET INKS CONTAINING ALUMINUM STABILIZED COLLOIDAL SILICA

[75] Inventors: Thomas W. Martin; Douglas E. Bugner, both of Rochester, N.Y.

[73] Assignee: Eastman Kodak Company, Rochester, N.Y.

[21] Appl. No.: 09/126,866

[22] Filed: Jul. 31, 1998

[51] Int. Cl.$^{6}$ ...................................................... C09D 11/02

[52] U.S. Cl. ................... 106/31.65; 106/31.6; 106/31.85

[58] Field of Search ............................... 106/31.65, 31.6, 106/31.85

[56] References Cited

U.S. PATENT DOCUMENTS

| | | | |
|---|---|---|---|
| 4,597,794 | 7/1986 | Ohta et al. | 106/31.6 |
| 4,765,243 | 8/1988 | Schiefer et al. | 106/31.86 |
| 5,085,698 | 2/1992 | Ma et al. | 106/31.6 |
| 5,172,133 | 12/1992 | Suga et al. | 106/31.6 |
| 5,221,332 | 6/1993 | Kohlmeier | 106/31.33 |
| 5,492,952 | 2/1996 | Tonogaki et al. | 106/31.43 |
| 5,827,363 | 10/1998 | Darsillo et al. | 106/31.9 |

*Primary Examiner*—Helene Klemanski
*Attorney, Agent, or Firm*—Doreen M. Wells

[57] ABSTRACT

A pigmented ink jet ink comprising an aqueous carrier medium, a pigment, and aluminum stabilized colloidal silica particles of average particle size from 0.005 $\mu$m to 0.050 $\mu$m.

10 Claims, No Drawings

PIGMENTED INKJET INKS CONTAINING ALUMINUM STABILIZED COLLOIDAL SILICA

CROSS REFERENCE TO RELATED APPLICATIONS

This application is related to the following commonly owned US application filed on even date herewith: Docket 77,064, U.S. Serial No. 09/127,000 of Shaw-Klein and Martin, titled "MATCHED INK/RECEIVER SET CONTAINING COLLOIDAL INORGANIC PARTICLES."

FIELD OF THE INVENTION

This invention relates to aqueous inks which utilize pigments as colorants and which are useful for ink jet printing applications. Specifically, this invention relates to additives to pigmented inks which increase the optical density and improve abrasion resistance of solid area patches when printed on coated papers and films.

BACKGROUND OF THE INVENTION

The ink formulations of the present invention are employed in imaging processes which involve the application of liquid ink droplets in a pixel-by-pixel manner to an ink-receiving element. There are numerous schemes which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to the ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation.

The inks used in the various ink jet printers can be classified as either dye-based or pigment-based. A dye is a colorant which is molecularly dispersed or solvated by the carrier medium. The carrier medium can be a liquid or a solid at room temperature. A commonly used carrier medium is water or a mixture of water and organic cosolvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor lightfastness. When water is used as the carrier medium, such inks also generally suffer from poor waterfastness.

Pigment-based inks have been gaining in popularity as a means of addressing these limitations. In pigment-based inks, the colorant exists as discrete particles. These pigment particles are usually treated with addenda known as dispersants or stabilizers which serve to keep the pigment particles from agglomerating and/or settling out. Pigment-based inks suffer from a different set of deficiencies than dye-based inks. One deficiency is related to the observation that pigment-based inks interact differently with specially coated papers and films, such as the transparent films used for overhead projection and the glossy papers and opaque white films used for high quality graphics and pictorial output. In particular, it has been observed that pigment-based inks produce imaged areas that are entirely on the surface of coated papers and films. These imaged areas are generally susceptible to being rubbed off by abrading with another sheet of receiver stock. This causes changes in image densities and/or loss of information. This problem appears to be unique to images printed with pigmented inks on coated papers and films.

U.S. Pat. No. 5,221,332 discloses the addition of colloidal silica particles to increase drop volume and drop velocity of dye-based ink jet inks. Colloidal silica dispersions stabilized by base addition do not exhibit the improvements gained with the addition of aluminum stabilized colloidal silica particles. Addition of these colloidal silica dispersions, stabilized by base addition, to pigmented inks produce images of low optical density when printed on glossy papers and films. However, addition of colloidal silica dispersions, stabilized by aluminum addition to the dispersed silica particles, to pigmented inks does produce images of high optical density when printed on glossy papers and films.

What is needed in the art are ink jet inks, particularly pigment-based inks, which can produce on glossy coated papers and films high quality printed images which are not easily removed by rubbing or abrasion.

SUMMARY OF THE INVENTION

We have unexpectedly found that the addition of certain additives to the pigment-based inks greatly reduces or eliminates the above mentioned problem. In addition, these additives produce inks that print to greater optical density than a comparable ink not containing the additive. Preferred additives are aluminum stabilized colloidal silica dispersions with average particle sizes of <0.050 $\mu$m.

The present invention discloses a pigmented ink jet ink comprising an aqueous carrier medium, a pigment, and aluminum stabilized colloidal silica particles of average particle size from 0.005 $\mu$m to 0.050 $\mu$m.

When inks of the present invention are printed onto glossy coated papers and films containing an imaging layer consisting primarily of gelatin, they result in uniform, crack-free text and solid area fills of high optical density and are highly resistant to being rubbed off by abrasion.

DETAILED DESCRIPTION OF THE INVENTION

Inks useful for ink jet recording processes generally comprise at least a mixture of a solvent and a colorant. The preferred solvent is de-ionized water, and the colorant is either a pigment or a dye. Pigments are often preferred over dyes because they generally offer improved waterfastness and lightfastness on glossy papers and films, as well as, plain paper.

Pigmented inks are most commonly prepared in two steps:

1. a pigment milling step in which the as-received pigment is de-aggregated into its primary particle size, and
2. a dilution step in which the pigment mill grind is converted into a useable ink.

Processes for preparing pigmented ink jet inks involve blending the pigment, an additive known as a stabilizer or dispersant, a liquid carrier medium, grinding media, and other optional addenda such as surfactants and defoamers. This pigment slurry is then milled using any of a variety of hardware such as ball mills, media mills, high speed dispersers, and roll mills.

In the practice of the present invention, any of the known pigments can be used. The exact choice of pigment will depend upon the specific color reproduction and image stability requirements of the printer and application. For a list of pigments useful in inkjet inks, see U.S. Pat. No. 5,085,698, column 7, line 10 through column 8, line 48.

The liquid carrier medium can also vary widely and again will depend on the nature of the ink jet printer for which the inks are intended. For printers which use aqueous inks, water, or a mixture of water with miscible organic co-solvents, is the preferred carrier medium.

The dispersant is another ingredient that might be added to the mill grind. Although there are many dispersants known in the art, the best dispersant will be a function of the carrier medium and the pigment. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Our most preferred dispersant is oleoyl methyl taurine (OMT) sodium salt, obtained from Synthetic Chemical Div. of Eastman Kodak Company.

In the dilution step, other ingredients are also commonly added to pigmented ink jet inks. Cosolvents (0–20 wt %) are added to help prevent the ink from drying out or crusting in the orifices of the printhead or to help the ink penetrate the receiving substrate, especially when the substrate is a highly sized paper. Preferred cosolvents for the inks of the present invention are glycerol, ethylene glycol, and diethylene glycol, and mixtures thereof, at overall concentrations ranging from 5 to 15 wt %.

In the context of the present invention, an especially important additive is aluminum stabilized colloidal silica particles of average particle size of <0.050 μm. The preferred range of particle sizes is 0.005 μm to 0.025 μm.

It has been unexpectedly found that improved image quality, excellent optical density, and improved rub resistance on coated papers and films can be achieved when aluminum stabilized colloidal silica particles of average particle size <0.050 μm are added to the ink compositions. Most preferred are concentrations ranging from about 0.50 to 15.0 wt %.

A biocide (0.01–1.0 wt %) may be added to prevent unwanted microbial growth which may occur in the ink over time. A preferred biocide for the inks of the present invention is Proxel™ GXL (obtained from Zeneca Colours) at a final concentration of 0.05–0.5 wt %.

Additional additives which may optionally be present in ink jet inks include conductivity enhancing agents, anti-kogation agents, drying agents, and defoamers.

EXAMPLES

| Mill Grind | |
|---|---|
| Polymeric beads, mean diameter of 50 μm (milling media) | 325.0 g |
| Black Pearls 880 (Cabot Chemical Company)(pigment black 7) | 30.0 g |
| Oleoyl methyl taurine, (OMT) sodium salt | 10.5 g |
| De-ionized water | 209.5 g |
| Proxel ™ GLX (biocide from Zeneca) | 0.2 g |

The above components were milled using a high energy media mill manufactured by Morehouse-Cowles Hochmeyer. The mill was run for 8 hours at room temperature. The particle size distribution was determined using a Leeds and Northrup Ultra Particle Size Analyzer (UPA). The D50 (50% of the particles were smaller than this value) of the mill grind was about 0.080 μm. Mill grinds were prepared in a similar manner substituting Hansa Brilliant Yellow (Hoecsht, pigment yellow 74), Sunfast Magenta 122 (Sun Chemical, pigment red 122) and Bis(phthalocyanylalumino)tetraphenyldisiloxane (cyan pigment) manufactured by Kodak in the mill grind formulation. The D50 for the pigment yellow 74 mill grind was about 0.010 μm, the pigment red 122 mill grind was about 0.010 μm and the cyan pigment mill grind was about 0.011 μm.

Comparative Example 1A

An aliquot of the pigment black 7 dispersion to yield 2.0 g pigment was mixed with 5.0 g diethylene glycol, 5.0 g glycerol, and additional de-ionized water for a total of 100.0 g. This ink was filtered through 3 μm filter and introduced into an empty Hewlett-Packard 51626A print cartridge. Images were made with a Hewlett-Packard DeskJet™ 540 printer on KODAK EKTAJET™ Type LF Semigloss Paper. Image cracks were quite noticeable in printed solid area fills.

Comparative Examples 1B–1D

Inks were prepared in a similar manner as described in Comparative Example 1A except that the black mill grind was replaced by yellow mill grind (pigment yellow 74) to result in 2.25 wt % pigment, Comparative Example 1B, magenta mill grind (pigment red 122) to result in 3.25 wt % pigment, Comparative Example 1C, or cyan pigment mill grind to result in 2.25 wt % pigment, Comparative Example 1D. The inks were printed as in Comparative Example 1A and image cracking was noticeable in each sample.

Comparative Example 2A–2D

Inks were prepared in a similar manner as those in Comparative Examples 1A–1D except that 0.20 wt % Strodex™ PK-90 (obtained from Dexter Chemical) was added to the inks of Comparative Example 1A and 1B, 0.50 wt % of Strodex™ PK-90 was added to the ink of Comparative Example 1C and 0.60 wt % Strodex™ PK-90 was added to the ink of Comparative Example 1D. Images from this ink were very smooth without any signs of image cracking.

Comparative Example 3A–3B

Inks were prepared in a similar manner as those in Comparative Examples 1A–1D except that 5.0 wt % of colloidal silica particles from Ludox™ HS-30 (sodium hydroxide stabilized, 0.012 μm colloidal silica from DuPont) was added to the ink of Comparative Example 1A and 2.5 wt % of colloidal silica particles from Ludox™ HS-40 were added to the ink of Comparative Example 1B. The inks were printed as in Comparative Example 1A and the resulting images were of low optical density and exhibited poor solid area fill.

Examples 1–3

Inks were prepared in a similar manner as those in Comparative Examples 1B–1D except that 13.33 g of Ludox™ AM (aluminum stabilized colloidal silica with an average particle size of about 0.012 μm manufactured by DuPont) was added. The amount of water added was adjusted to result in a silica concentration in each ink of 4.0 wt %. Images from these inks were very smooth without any signs of image cracking or starvation lines.

Examples 4–7

Inks were prepared in a similar manner as those in Comparative Examples 2A–2D except that 13.33 g of Ludox™ AM was added and the amount of added water adjusted to result in a silica concentration in each ink of 4.0 wt %. Images printed from these inks were of high quality with no cracking.

Rub Testing

Images were printed on Kodak Ektajet™ LF Semigloss Paper with each of the inks described above and allowed to dry under ambient conditions for at least 24 hours. The image area was about 5 cm by 13 cm. The density was read at about 1 cm in from each corner and the middle of each sample with an Xrite™ Photographic Densitometer. These density readings were averaged. The procedure was repeated for 4 samples of each ink and the average density for the 4 samples was recorded as the Density Before.

Samples were then mounted on a 1 Kg weight and connected to the rub arm of an Ink Rub Tester (manufactured by Testing Machines, Inc.). A 7 cm by 15 cm sample of Kodak Ektajet™ paper is mounted to the stationary platform with the backside facing the image sample. The sample is rubbed for 50 strokes (about 1 minute). The density is read as above and averaged. The procedure is repeated for four samples of each ink and the results are averaged and recorded as Density After. The results for the examples described above are summarized in Table 1.

TABLE 1

Rub resistance results for images with and without Ludox AM ™ added to the inks printed on Kodak semigloss paper.

| Example | Pigment | Wt % Pig-ment | Wt % PK-90 | Silica | Density Before | Density After | % Density Retained |
|---|---|---|---|---|---|---|---|
| C-2A | pb 7 | 2.0 | 0.2 | 0 | 2.46 | 1.58 | 64.2 |
| E-4 | " | " | 0.2 | 4.0 | 2.58 | 2.56 | 99.2 |
| C-1B | py 74 | 2.25 | 0 | 0 | 2.03 | 1.72 | 84.7 |
| C-2B | " | " | 0.2 | 0 | 2.04 | 1.86 | 91.2 |
| E-1 | " | " | 0 | 4.0 | 1.97 | 1.79 | 90.9 |
| E-5 | " | " | 0.2 | 4.0 | 2.09 | 2.00 | 95.7 |
| C-1C | pr 122 | 3.25 | 0 | 0 | 2.39 | 1.85 | 77.4 |
| C-2C | " | " | 0.5 | 0 | 2.40 | 2.03 | 84.6 |
| E-2 | " | " | 0 | 4.0 | 1.63 | 1.43 | 87.7 |
| E-6 | " | " | 0.5 | 4.0 | 2.27 | 2.15 | 94.7 |
| C-1D | cyan | 2.25 | 0 | 0 | 2.22 | 1.78 | 80.3 |
| C-2D | " | " | 0.6 | 0 | 2.45 | 1.94 | 79.2 |
| E-3 | " | " | 0 | 4.0 | 2.09 | 1.83 | 87.6 |
| E-7 | " | " | 0.6 | 4.0 | 2.43 | 2.27 | 93.4 |

pr = pigment red
pb = pigment black
py = pigment yellow
C = comparative example
E = example

Example 8

An aliquot of the pigment black 7 mill grind to yield 2.0 g pigment was mixed with 9.0 g diethylene glycol, 9.0 g of glycerol, 0.50 g of Strodex PK-90™, 21.0 g of Ludox AM™ and additional de-ionized water to result in 100.0 g of ink. The ink was filtered and printed in the same manner as in Comparative Example 1A.

Example 9

An aliquot of the pigment yellow 74 mill grind to yield 2.25 g pigment was mixed with 8.0 g diethylene glycol, 12.0 g of glycerol, 0.60 g of Strodex PK-9™, 33.3 g of Ludox AM™ and additional de-ionized water to result in 100.0 g of ink. The ink was filtered and printed in the same manner as in Comparative Example 1A.

Example 10

An aliquot of the pigment red 122 mill grind to yield 3.25 g pigment was mixed with 10.8 g diethylene glycol, 7.2 g of glycerol, 0.60 g of Strodex PK-90™, 21.0 g of Ludox AM™ and additional de-ionized water to result in 100.0 g of ink. The ink was filtered and printed in the same manner as in Comparative Example 1A.

Example 11

An aliquot of the cyan pigment mill grind to yield 2.25g pigment was mixed with 8.0 g diethylene glycol, 12.0 g of glycerol, 0.50 g of Strodex PK-90™, 18.0 g of Ludox AM™ and additional de-ionized water to result in 100.0 g of ink. The ink was filtered and printed in the same manner as in Comparative Example 1A.

The inks prepared in Examples 8–11 were printed as in Comparative Example 1A. Images made with these inks exhibited excellent quality without any signs of cracking. The maximum optical density of each image was measured with an Xrite™ Photographic Densitometer and the results are summarized in Table 2.

TABLE 2

Maximum optical densities of images printed from inks with and without Ludox ™ added printed on Kodak semigloss paper.

| Example | Pigment | Weight % | Wt % PK-90 | Wt % Silica | Dmax |
|---|---|---|---|---|---|
| C-1A | pb 7 | 2.0 | 0 | 0 | 2.40 |
| E-8 | pb 7 | 2.0 | 0.5 | 7.0 | 2.64 |
| C-1B | py 74 | 2.25 | 0 | 0 | 2.03 |
| E-9 | py 74 | 2.25 | 0.6 | 10.0 | 2.15 |
| C-1C | pr 122 | 3.25 | 0 | 0 | 2.39 |
| E-10 | pr 122 | 3.25 | 0.6 | 7.0 | 2.63 |
| C-1D | cyan | 2.25 | 0 | 0 | 1.99 |
| E-11 | cyan | 2.25 | 0.5 | 5.4 | 2.60 |
| C-3A | pb 7 | 2.0 | 0 | 5.0 | 0.84 |
| C-3B | py 74 | 2.25 | 0 | 2.5 | 1.03 |

The results summarized in Tables 1 and 2 clearly indicate that images printed with the inks of this invention exhibit higher optical density and superior rub resistance compared to control inks when printed on “photo-glossy” paper.

The invention has been described in detail with particular reference to certain preferred embodiments thereof, but it will be understood that variations and modifications can be effected within the spirit and scope of the invention.

What is claimed:

1. A pigmented ink jet ink comprising an aqueous carrier medium, a pigment, and aluminum stabilized colloidal silica particles of average particle size from 0.005 μm to 0.050 μm.

2. An ink jet ink comprising an aqueous carrier medium, a pigment, and aluminum stabilized colloidal silica particles of average particle size from 0.005 μm to 0.050 μm, said silica particles being between 0.5 and 10 weight percent of the ink composition.

3. The pigmented ink jet ink of claim 1 or 2 wherein the average particle size of the aluminum stabilized colloidal silica particles is from 0.025 μm to 0.050 μm.

4. The pigmented ink jet ink of claim 1 or 2, further comprising optional addenda selected from dispersant, humectant, surfactant, and biocide.

5. The pigmented ink jet ink of claim 1 wherein the colloidal silica particles is between 0.5 and 15 weight percent of the ink composition.

6. The pigmented ink jet ink of claim 1 wherein the colloidal silica particles is between 0.5 and 10 weight percent of the ink composition.

7. A method of improving the optical density and abrasion resistance of an ink jet ink image comprising the steps of:

a) providing an ink jet ink receiving layer; and b) depositing pigment-based ink jet ink to form an image on the ink receiving layer; wherein said pigment-based ink jet ink comprises an aqueous carrier medium, a pigment, and aluminum stabilized colloidal silica particles of average particle size from 0.005 μm to 0.050 μm.

8. A method of improving the optical density and abrasion resistance of an ink jet ink image comprising the steps of:

a) providing an ink jet ink receiving layer; and b) depositing ink jet ink to form an image on the ink receiving layer;

wherein said ink jet ink comprises an aqueous carrier medium, a pigment, and aluminum stabilized colloidal silica particles of average particle size between 0.005 μm and 0.050μm, said silica particles being between 0.5 and 10 weight percent of the ink composition.

9. An ink jet printing method, comprising the steps of:

providing an ink jet printer that is responsive to digital data signals;

loading the printer with ink receptive substrates;

loading the printer with a pigmented ink jet ink comprising an aqueous carrier medium, a pigment, and aluminum stabilized colloidal silica particles of average particle size between 0.005 μm and 0.050 μm.; and printing on the ink receptive substrates in response to the digital data signals.

10. An ink jet printing method, comprising the steps of:

providing an ink jet printer that is responsive to digital data signals;

loading the printer with ink jet ink receptive substrates;

loading the printer with an ink jet ink comprising an aqueous carrier medium, a pigment, and aluminum stabilized colloidal silica particles of average particle size between 0.005 μm and 0.050 μm, said silica particles being between 0.5 and 10 weight percent of the ink composition; and printing on the ink receptive substrates in response to the digital data signals.

* * * * *